(12) United States Patent
Kellar et al.

(10) Patent No.: US 10,358,569 B2
(45) Date of Patent: Jul. 23, 2019

(54) SYSTEMS AND METHODS FOR PRINTING PATTERNS USING NEAR INFRARED UPCONVERTING INKS

(71) Applicant: South Dakota Board of Regents, Pierre, SD (US)

(72) Inventors: Jon Kellar, Rapid City, SD (US); P. Stanley May, Rapid City, SD (US); William Cross, Rapid City, SD (US); Jeevan Meruga, Rapid City, SD (US); Tyler Blumenthal, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 0 days.

(21) Appl. No.: 14/213,350

(22) Filed: Mar. 14, 2014

(65) Prior Publication Data
US 2014/0261031 A1    Sep. 18, 2014

Related U.S. Application Data

(60) Provisional application No. 61/827,392, filed on May 24, 2013, provisional application No. 61/800,314, filed on Mar. 15, 2013.

(51) Int. Cl.
*B41F 17/00* (2006.01)
*C09D 11/50* (2014.01)
(Continued)

(52) U.S. Cl.
CPC ............ *C09D 11/50* (2013.01); *B42D 25/382* (2014.10); *C09D 11/037* (2013.01);
(Continued)

(58) Field of Classification Search
CPC ....... B41F 17/00; C09D 11/50; C09D 11/322; C09D 11/037; B42D 25/382; B41M 3/14
See application file for complete search history.

(56) References Cited

U.S. PATENT DOCUMENTS

| 2002/0041372 A1 | 4/2002 | Gardner et al. |
| 2005/0264001 A1 | 12/2005 | Kerns et al. |
(Continued)

FOREIGN PATENT DOCUMENTS

WO   2014140431 A1   9/2014

OTHER PUBLICATIONS

"International Application No. PCT/US2016/018817 International Search Report and Written Opinion", dated Apr. 25, 2016, 10 pages.
(Continued)

*Primary Examiner* — Robert J Grun
*Assistant Examiner* — Michael Robinson
(74) *Attorney, Agent, or Firm* — Goodhue, Coleman & Owens, P.C.

(57) ABSTRACT

The present invention relates generally to using upconverting inks for producing highly-resolved patterns for, inter alia, security applications. More specifically, the present invention relates to the use of sols (inks) and printing processes that produce well-defined printed features consisting of polymers impregnated with luminescent upconversion nanocrystals. The patterns printed using such inks and processes may exhibit defined shapes, characters of text, and various other types of images.

14 Claims, 5 Drawing Sheets

(51) Int. Cl.
   *B42D 25/382*   (2014.01)
   *C09D 11/037*   (2014.01)
   *C09D 11/322*   (2014.01)
   *B41M 3/14*   (2006.01)

(52) U.S. Cl.
   CPC ............ *C09D 11/322* (2013.01); *B41F 17/00* (2013.01); *B41M 3/14* (2013.01)

(56) References Cited

U.S. PATENT DOCUMENTS

| | | | |
|---|---|---|---|
| 2007/0062411 A1* | 3/2007 | Weisman | B82Y 25/00 |
| | | | 106/31.15 |
| 2009/0027775 A1* | 1/2009 | Nilsen | G06K 19/06046 |
| | | | 359/515 |
| 2009/0042314 A1* | 2/2009 | Capobianco | B82Y 15/00 |
| | | | 436/501 |
| 2009/0051027 A1 | 2/2009 | Lin | |
| 2009/0121189 A1* | 5/2009 | Ju | C09K 11/7773 |
| | | | 252/301.6 R |
| 2009/0122412 A1 | 5/2009 | Steenblik et al. | |
| 2012/0064134 A1* | 3/2012 | Bourke, Jr. | A61Q 17/04 |
| | | | 424/401 |
| 2013/0087622 A1 | 4/2013 | Collins et al. | |
| 2013/0302358 A1 | 11/2013 | Collins et al. | |
| 2014/0261031 A1 | 9/2014 | Kellar et al. | |

OTHER PUBLICATIONS

"International Application No. PCT/US2014/052294 International Preliminary Report on Patentability", dated Sep. 14, 2016, 5 pages.

* cited by examiner

SYSTEMS AND METHODS FOR PRINTING PATTERNS USING NEAR INFRARED UPCONVERTING INKS

CROSS REFERENCE TO RELATED APPLICATIONS

This application claims priority under 35 U.S.C. § 119 to provisional applications U.S. Ser. No. 61/800,314 filed Mar. 15, 2013 and 61/827,392 filed May 24, 2013 all of which are incorporated by reference in their entirety.

STATEMENT REGARDING FEDERALLY FUNDED RESEARCH

This invention was made with government support under the National Science Foundation/EPSCoR Grant No. 0903804, and National Science Foundation Grants CHE 0840507 and CHE 0722632. Additional support was provided by the National Aeronautics and Space Administration (Cooperative Agreement Number: NNX10AN34A).

TECHNICAL FIELD

The present invention relates generally to using upconverting inks for producing highly-resolved patterns for, inter alia, security applications. More specifically, the present invention relates to the use of sols (inks) and printing processes that produce well-defined printed features consisting of polymers impregnated with luminescent upconversion nanocrystals. The patterns printed using such inks and processes may exhibit defined shapes, characters of text, and various other types of images.

BACKGROUND OF THE INVENTION

Printing systems that employ upconversion phosphors that can efficiently upconvert near-infrared (NIR) light into visible and NIR luminescence using inexpensive diode lasers have numerous potential applications in science and technology. For example, such systems are useful in storage-disk production, solar cells, security applications, and transparent displays.

For security printing applications, most semi-overt/semi-covert and covert markings are printed with ultraviolet (UV)-to-visible inks. Yet, UV-to-visible downconversion security inks have become much easier to obtain and duplicate. Accordingly, printed features using these inks are easy to reproduce in the form of counterfeit items such as identity cards, currency, and other important documents. The use of upconversion security inks may provide the next generation of security. Kim et al. fabricated photopatterned microstructure films containing $NaYF_4$ co-doped with rare earth ions for security type films that utilize NIR-to-visible upconversion. These photopatterned microstructures were developed to be excited by low powered, readily available, continuous wave diode lasers. Films were also printed in layers containing different ion compositions to generate various color-coded patterning. However, these technologies require a complex three-step process consisting of spin casting, photopatterning through a mask, and solvent-based pattern development.

The present invention utilizes an ink formulation in the form of a composite material, combined with a printing process capable of producing printed features ranging, for example, from 45 µm to 1 cm, from 20 µm to 5 cm, and/or from 10 µm to 10 cm. The prepared inks can be deposited via a number of different printing systems (including screen printing and aerosol jet printing) for either precision detailing or large scale production on a variety of surfaces. Printed features are generated in a single printing step, and little or no post-processing is required. These upconverting films are relatively high in sophistication and, as such, are useful for counterfeit protection.

SUMMARY OF THE INVENTION

The following simplified summary provides a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented below.

In one embodiment, the invention is a system for printing patterns onto a substrate that includes: preparing a near infrared (NIR)-to-visible upconverting ink, wherein the ink comprises nanocrystals that host at least two lanthanide metals, wherein the nanocrystals are capped with an organic ligand, and wherein the ink is formed by mixing the nanocrystals with a polymer in a solvent capable of dissolving the polymer and dispersing the nanocrystals; and directly depositing the ink onto the substrate in a predetermined pattern; wherein the predetermined pattern may or may not require post-processing, and preferably needs little or no post-processing.

The nanocrystals can be, for example, $\beta$-$NaYF_4$ nanocrystals, such as a mixture of Er and Yb-based nanocrystals (green); a mixture of Tm and Yb-based nanocrystals (blue) and/or a mixture of Tm and Er-based nanocrystals (red).

The polymer can be, for example, poly(methyl methacrylate) (PMMA).

Although a variety of printing systems can be utilized, they include for example, a direct-write printing system such as maskless mesoscale materials deposition ($M^3D$).

Many different organic ligands that are useful as capping agents are known in the literature, such as carboxylic acids like oleic acid.

In one embodiment, solvent is a mixture of toluene and methyl benzoate, with the proviso that the majority by volume of the solvent is toluene. For example, the mixture may be 90:10 mixture of toluene and methyl benzoate v/v.

Another aspect of the invention is a method for generating a visual security code on a substrate that includes the steps of: preparing a near infrared (NIR)-to-visible upconverting ink, wherein the ink comprises nanocrystals of at least two lanthanide metals capped with an organic ligand, and wherein the ink is formed by mixing the nanocrystals with a polymer in a solvent capable of dissolving the polymer; directly depositing the ink onto the substrate in a predetermined pattern, wherein the pattern is invisible under ambient light; exposing the pattern to NIR light without post-processing to produce a visible multi-color pattern, wherein the colors of the multi-color pattern are in the red-green-blue (RGB) color space; and viewing the visible multi-color pattern. Other aspects of this method are as described for the system above.

In addition, using the method just described, the pattern may be visualized by exposing it, for example, to NIR at 980 nm, and can thereafter be viewed on any viewing device, such as a smart phone.

Other aspects of the invention are found elsewhere in the specification.

DETAILED DESCRIPTION OF THE INVENTION

Figure 1:
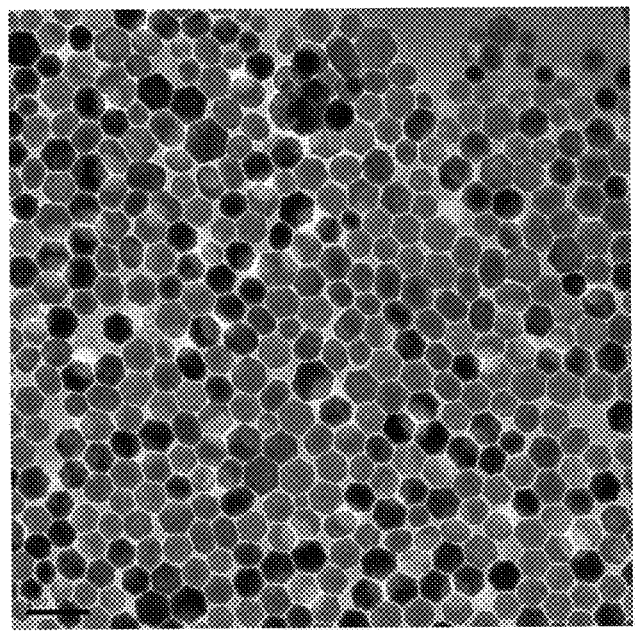
FIG. 1 depicts a transmission electron micrograph (TEM) image of oleic-acid-capped nanocrystals of β-NaYF$_4$: 3% Er, 17% Yb. Nanocrystal size is 70±15 nm.

The present invention relates generally to using upconverting inks and printing processes for producing highly-resolved patterns for, inter alia, security applications. More specifically, the present invention relates to the use of ink formulations that, when printed or written, produce highly articulated patterns or characters consisting of polymers impregnated with luminescent upconversion nanocrystals. The printed features produced using these materials and methods, which include shapes, patters and text, are not visually distinguishable under ambient or UV illumination, but are visible as mono- or multicolored luminescent images under near-infrared (NIR) illumination (≤10 W/cm$^2$). Moreover, the patterns require no post-processing (e.g., photomasking photolithography, chemical development, heat treatment, etc.) beyond the printing step to produce or stabilize the image.

As described herein, the composite nanocrystal-based inks of the present invention are compatible with a number of different printing systems for producing highly-resolved (<100 μm) printed features which are invisible under ambient light, but produce luminescent images, consisting of one or more colors, visible by the naked-eye upon excitation, such as exposure to 980 nm light. The composite inks can be printed on a wide variety of substrates (paper, textiles, tape, etc.), and the luminescent images are viewable using relatively low excitation power densities (≤5 W/cm$^2$), so that image readers can be constructed from inexpensive diode lasers. Such images are produced using only a microscopic amount of nanocrystals per square centimeter.

In the description that follows, a number of terms used in the field of nanotechnology, polymeric inks and printing methodologies are extensively utilized. In order to provide a clear and consistent understanding of the specification and claims, including the scope to be given such terms, the following non-limiting definitions are provided.

When the terms "one," "a," or "an" are used in this disclosure, they mean "at least one" or "one or more," unless otherwise indicated.

The term "upconverting ink" means a printable or writable ink that emits light which has a wavelength shorter than the excitation wavelength. For example, visible 540 nm emission might be produced using near-infrared 980 nm excitation using an upconverting ink.

The term "downconverting ink" means a printable or writable ink that emits light which has a wavelength longer than the excitation light. For example, visible 540 nm emission might be produced using UV 350 nm excitation using a downconverting ink.

The term "nanocrystals" means discrete, single crystals of matter with unit size ≤100 nm.

The term "lanthanide doped nanocrystals" means discrete single crystals of matter with unit size ≤100 nm into which trivalent (triply-charged) lanthanide ions (Ln$^{3+}$) have been doped or embedded.

The term "NIR-to-visible" means the conversion of NIR excitation light to visible emission.

The term "direct-write printing" means an additive technology used to controllably deposit features onto samples in patterns defined by computer-aided design/computer-aided manufacturing (CAD/CAM) software allowing rapid prototyping of various geometries without the use of lithography The term "screen-printing" means a printing technique in which the ink is applied through a stencil to achieve the desired design.

Nanocrystals

The present invention utilizes upconverting nanocrystals. In one embodiment, the nanocrystals are formed by doping optically active lanthanide ions (Ln$^{3+}$), such as Yb$^{3+}$, Er$^{3+}$, and Tm$^{3+}$ into optically transparent fluoride nanocrystals, such as β-NaYF$_4$. These nanocrystals can be prepared using known methods, such as those described in References 17 and 18 listed below, which use sodium fluoride or ammonium fluoride, instead of the more hazardous trifluoroacetates described in other methods.

Nanocrystal size can be controlled from 30-100 nm using reaction temperature and time. The reaction produces β-NaYF$_4$ nanocrystals that are phase pure (Beta or hexagonal phase), with no contamination of insoluble precursors. The hexagonal-phase β-NaYF$_4$ nanocrystals are depicted in FIG. 1, and are known to be much more efficient lattices for NIR-to-visible upconversion compared to cubic-phase α-NaYF$_4$ The as-synthesized upconversion nanocrystals have an organic acid, such as a carboxylic acid like oleic acid, as a capping agent and can be dispersed in a variety of non-polar to slightly-polar organic solvents. The solubility of the resulting upconversion nanocrystals can be altered by chemical exchange of the capping ligands, for example exchanging oleic acid with citrate, polyvinylpyrrolidone (PVP), poly(acrylic acid), mercaptoundecanoic acid, or modified silica.

Figure 2:
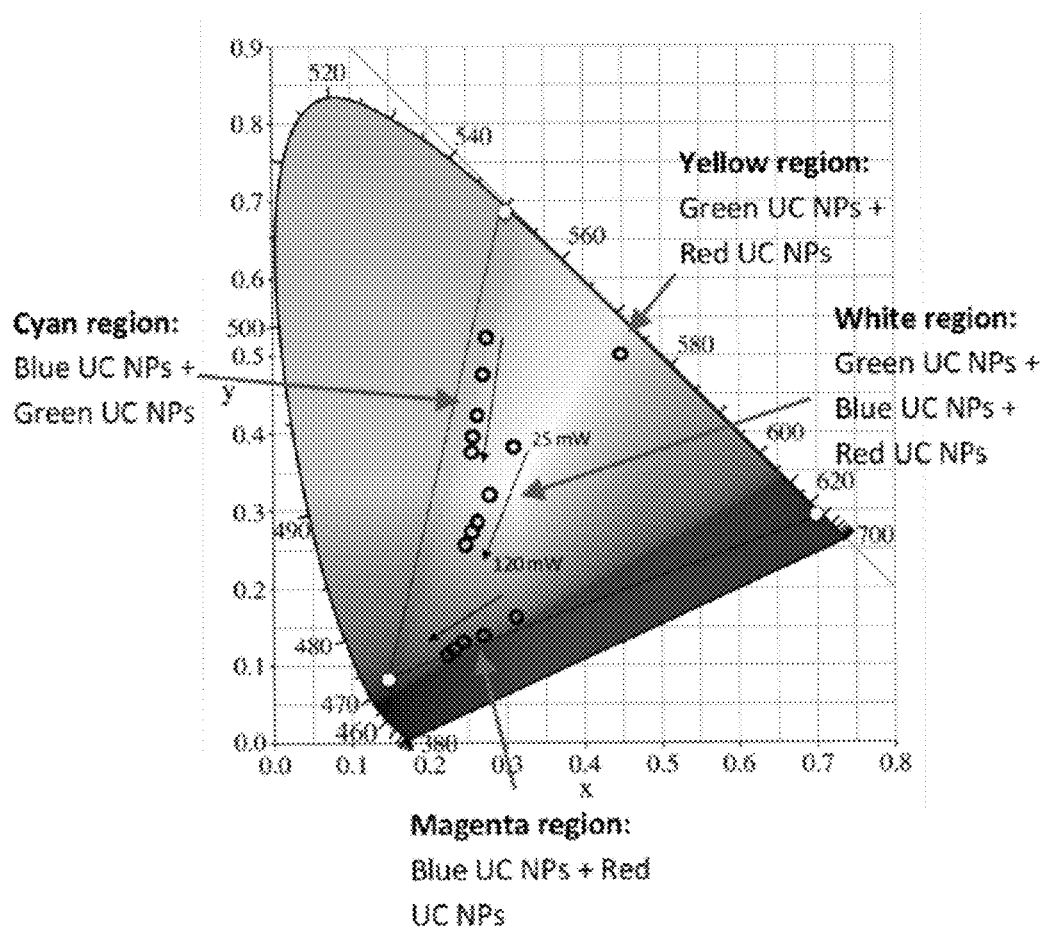
FIG. 2 depicts a diagram used to define the color space of the red, green and blue (RGB) print system described herein. The vertices of the triangle indicate the color of the upconversion luminescence of the red (x=0.69, y=0.28), green (x=0.30, y=0.68) and blue (x=0.15, y=0.07) inks, respectively. The print system can produce luminescent images of any combination of colors that fall within the triangle area. Secondary colors are produced by the controlled overlap printing of two or three of the primary color (RGB) inks. The C.I.E. coordinates of secondary colors produced using blue ink (e.g., cyan, magenta, white) depend on excitation power density, as well as the composition of the printed feature.

The color of the upconversion emission from the nanocrystals and, therefore, the printed features, as indicated in FIG. 2, can be adjusted to produce primary colors (red, green, blue). Secondary colors (such as cyan, magenta, yellow and white) within the RGB additive color model can be produced using a three-ink system (red, green, and blue). The position of the secondary colors within the RGB triangle shown in FIG. 2 is determined by the controlled overlap of the red, green and blue inks in the printing process, as well as by the power density of the NIR excitation. Printed features may also produce NIR-to-NIR upconversion emission at, for example, 800 nm.

Ink Formulation

Ink formulations consist of a sol containing the above-described nanocrystals, a solvent system, such as toluene:methyl benzoate, and a polymer that can be dissolved in the solvent system. The solvent system must produce a sol of low turbidity and with physical properties (e.g., viscosity, evaporation rate, surface tension) suitable for printing. Each individual ink formulation is activated by either red-, blue- or green-emitting upconversion nanocrystals.

Using a single component solvent, the dried polymer film is often thicker at the edges than in the center. This "coffee-ring" effect can be remedied by adding a co-solvent with a higher boiling point to equalize the evaporation rate across the printed feature.

In one particular embodiment, the solvent system is a mixture of two (or more) organic solvents, such that one solvent dissolves the polymer, and is the majority solvent in the solvent solution (e.g., 51-90% by weight) and another solvent is added in, which is the minority solvent (e.g., 10-49% by weight) and is added to enhance printing quality. In one embodiment, the majority solvent is toluene, and the minority solvent is methyl benzoate and the dissolved polymer is poly(methyl methacrylate).

Examples of other solvents include xylene, methyl ethyl ketone, tetrahydrofuran, ethyl acetate, isopropyl acetate, n-propyl acetate, n-butyl acetate, N-methyl-2-pyrrolidone, cyclohexane, hexane, methanol, ethanol, isopropanol, butanol, methoxy propanol, ethoxy propanol, water and mixtures thereof. Other possible solvents include, for example, aromatic hydrocarbons, glycols, alcohols, ethers, acetates, and alkanes comprised of 4 to 12 carbon atoms and mixtures thereof. The solvent may also be selected, for example, from a group of toluene, xylene, methyl ethyl ketone, tetrahydrofuran, ethyl acetate, isopropyl acetate, n-propyl acetate, n-butyl acetate, N-methyl-2-pyrrolidone, cyclohexane, hexane, methanol, ethanol, isopropanol, butanol, methoxy propanol, ethoxy propanol, water and mixtures thereof. The solvent, for example, may comprise at least 50 to 100 vol % of the solvent system.

Examples of co-solvents with boiling points higher than the main solvent include ethylene glycol, propylene glycol, diethylene glycol monobutyl ether, diethylene glycol dimethyl ether, glycerol, dimethylformamide, dimethylacetamide, cyclohexanone, terpinol, decalin, methyl benzoate, octanol and mixtures thereof. The co-solvent may be ones selected having a high boiling point temperature and, for example, from the group of ethylene glycol, propylene glycol, diethylene glycol monobutyl ether, diethylene glycol dimethyl ether, glycerol, dimethylformamide, dimethylacetamide, cyclohexanone, terpinol, decalin, methyl benzoate, octanol and mixtures thereof. In one aspect, the co-solvent may comprise 0.1 to 50 vol % of the solvent system.

Examples of other polymers include, for example, polyimide, polyester, polyethylene, polycarbonate, acrylonitrile butadiene styrene, polyethylene terephthalate, polytetrafluoroethylene, polyvinyl butyral, polyvinylpyrrolidone, polyamide, and polyvinyl alcohol.

The inks can be optimized for either equal or unequal upconversion intensity depending on the desired pattern post-conversion. For example, equal upconversion intensity in a final ink formulation may be: red, 6 wt %; green, 0.5 wt %; and blue, 5 wt % of nanoparticles in the formulation.

The printed material can be constructed from any or all of the RGB ink formulations. Alternatively, the inks can be combined together to form secondary colors (e.g., cyan, magenta) to enhance the complexity of the printed materials. Accordingly, the printed pattern can be a single color, a mixture of RGB combinations or a complex, multi-colored pattern in the form of a code or even a photograph-like rendering.

Printing

The inks can be printed using any system capable of achieving deposition of material to a solid surface. Such printing systems include, for example, direct-write printing systems (such as aerosol jet printing), screen printing (such as with a spray-coat system) and ink-jet printing. The ink formulations can easily be adapted to particular printing systems using routine optimization. Printing patterns that are viewable as multi-color upconversion luminescent images are produced using a three-ink RGB (red, green, and blue) system. Primary colors are produced with single-ink deposition, and secondary colors, such as magenta, cyan, yellow and white, are produced by controlled overlap printing using two or three of the primary inks. As shown in FIG. 2, the C.I.E. coordinates of secondary colors (e.g., cyan, magenta, white) involving the blue ink are affected by the NIR excitation power density. Therefore, the correct color representation of a printed image can only be produced using the correct excitation power. This can be used as a powerful additional security feature for the print system described herein.

The ink formulations of the present invention generally exhibit low viscosity (1000 cP or less) and are therefore suitable for use with a variety of printing methods (e.g. pneumatic atomization) and substrates.

In one embodiment, the printing system is a direct-write printing system such as the Sono-Tek Exacta Coat three-axis robot system from Sono-Tek Corporation (Orlando, Fla.) In another embodiment, the printing system is a maskless mesoscale materials deposition system ($M^3D$) from Optomec (Albuquerque, N. Mex.)

Upconversion and Visualization

Upconversion excitation can be delivered over a wavelength range of approximately 940-1070 nm, with optimal excitation efficiency at ~976 nm. Excitation can be supplied in the form of a diode laser operating, for example, close to 980 nm. Thereafter, the printed or written patterns produce visible light (i.e., 400-700 nm range) of various wavelength components that can be visually and spectroscopically detected and "read" as an articulate pattern or text. Alternatively, NIR-to-NIR upconversion images can be read using a standard digital camera or viewer. The NIR-to-NIR upconversion may also be read through long pass filter materials which block the upconverted visible wavelengths but passes the upconverted NIR wavelengths. Such materials include, for example, Schott Glass RG715, paint or mixtures thereof. The patterns or text can be monochrome or consist of any combination of colors in the RGB additive color model. At least one typical excitation density for viewing and processing upconversion emission images is ~5 $W/cm^2$ The exact color patterns of a luminescent image depend on the excitation power density, as well as the RGB composition of the printed features, so that the intended color pattern can only be produced using the correct excitation power density. This characteristic can be used as an authentication/security feature to verify the validity of the printed image or pattern. Similarly, the ratio of visible to NIR upconversion emission depends on the excitation power, and can also be used for verification.

Security Printed Films

Upconversion (NIR-to-visible) security films have emerged onto the research scene in recent years (References 13-16). Current security films often utilize UV-to-visible downconversion of light (Reference 14). These downconversion inks have become widely available and easily reproducible, allowing for counterfeit production with inkjet printers (ex: IDs, money, and significant documents). By the development of NIR-to-visible upconversion printed films a new level of semi-cover/covert and forensic security impossible.

New technological advances are being developed that utilize diode lasers to excite films much more cost efficiently. These lasers are now marketed with power outputs of several Watts and a battery power supply, making them adaptable to security check point applications.

EXAMPLES

Portions of the Examples described in this section are detailed in References 30 and 31 listed below.

Example 1

Synthesis of $\beta$-NaYF$_4$: 3% Er, 17% Yb Nanocrystals

Upconversion nanoparticles were synthesized using a previously-described procedure (References 17 and 18), with slight modifications as described in Reference 30. This synthesis uses sodium fluoride and lanthanide acetates or oleates as precursors, avoiding the use of the more hazardous metal trifluoroacetates. Although sodium fluoride is used as a fluoride source in other methods, the reaction described here is carried out under atmospheric pressure in a single-phase reaction mixture. The example given below is for the synthesis of nanoparticles used to create green upconversion inks. Similar synthetic methods are used to create red and blue upconversion inks. The primary difference in the nanoparticles used to activate the green, red and blue inks is the identity and doping levels of the Ln$^{3+}$ ions in the $\beta$-NaYF$_4$ lattice.

To prepare $\beta$-NaYF$_4$: 3% Er, 17% Yb nanocrystals, 0.4 mmol Y(CH$_3$COO)$_3$, 0.085 mmol Yb(CH$_3$COO)$_3$ and 0.015 mmol Er(CH$_3$COO)$_3$ were dissolved in 6 ml oleic acid. The lanthanide acetates were prepared by dissolving the desired combination of lanthanide oxides in a 50% v/v water/glacial-acetic-acid mixture, and refluxing until the solution became clear. The mixture was held at 100° C. under vacuum for 60 min to purge oxygen and water.

The fluoride-containing solution was prepared by dissolving 1 mmol CH$_3$COONa and 2 mmol NaF in 2 ml oleic acid and 10 ml of 1-octadecence. The mixture was maintained at 100° C. under vacuum for 30 min, and then heated, under N$_2$(g) flow, to the refluxing temperature of 315° C. The solution transformed from cloudy to clear and homogeneous at temperatures above 240° C., indicating the dissolution of NaF.

The lanthanide solution was then injected into the fluoride solution within as short a time as possible (a few seconds). The temperature of the reaction mixture dips momentarily, as a result of the injection, but recovers rapidly to reflux at 320° C. The boiling point increases slightly due to the increased oleic acid content resulting from the injection. The homogeneous, single-phase reaction mixture was maintained at 320° C. for 30 min. under Ar (or N$_2$(g)), and then allowed to cool to room temperature. The nanocrystals were then precipitated by the addition of ~100 mL of acetone, isolated by centrifugation at 5000 rpm, and dispersed in toluene. This process was repeated at least three times until the isolated product was white in appearance. The reported concentration of Er$^{3+}$ and Yb$^{3+}$ in the nanocrystals is nominal, based on the composition of the starting materials. The identity and phase purity of the product was confirmed by powder x-ray diffraction. This procedure typically resulted in nanocrystals of ~70 nm in diameter across the hexagonal face as determined by transmission electron microscopy (TEM). However, modifications of this procedure can be used to produce nanocrystals ranging in size from 30-100 nm.

Figure 3:
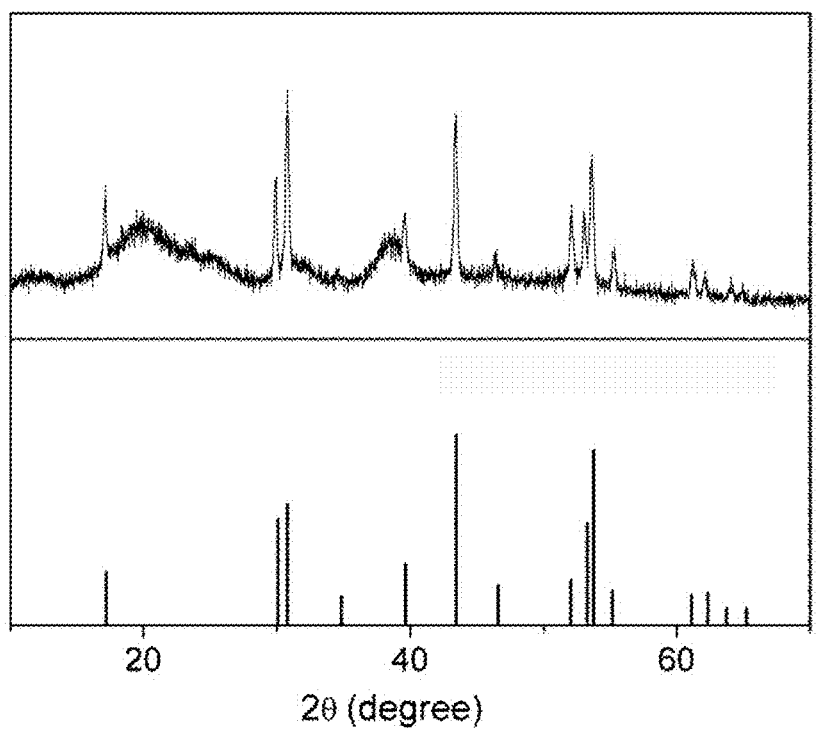
FIG. 3 depicts a Powder X-Ray diffraction of β-NaYF$_4$: 3% Er, 17% Yb nanocrystal sample compared to the International Centre for Diffraction Data (ICDD) Power Diffraction File (PDF) card for β-NaYF$_4$. Crystals are pure hexagonal phase.

A TEM image of $\beta$-NaYF$_4$: 3% Er, 17% Yb nanocrystals synthesized as described above is shown in FIG. 1. The diameter of the nanocrystals across the axial face is 70±15 nm. The size distribution varies only slightly from batch-to-batch, and no variation in the luminescence properties has been observed. The nanocrystals are of pure hexagonal phase, as shown by powder x-ray diffraction (FIG. 3). The reported doping levels of Er$^{3+}$ and Yb$^{3+}$ are nominal, based on the relative concentrations of starting materials.

Example 2

Preparation of Ink Dispersion

A 2 wt % dispersion of the nanocrystal sample from Example 1 in toluene was prepared by stirring vigorously for 2 h, followed by sonication for 10 min. Poly(methyl methacrylate) beads were added at 1 wt % to the nanocrystal dispersion along with enough methyl benzoate to bring the final composition of the solution to 90:10 v/v toluene/methyl benzoate. The resulting mixture was then stirred for 3 h to achieve complete dissolution of the polymer. For green and blue inks, the concentration of nanocrystals is adjusted, such that printed red, green, and blue features have suitable relative brightness. The inks produced in this manner are clear, exhibiting very low turbidity.

This example and the results obtained when printing with such an ink dispersion as described below demonstrate that direct-write printing of polymer solutions requires consideration of the chemistry of the solution in order to translate micron sized droplets into a uniform thin film. Toluene was used as the primary solvent for the ink because of its ability to print, to easily dissolve poly(methyl methacrylate) (PMMA), and to effectively disperse NaYF$_4$ nanoparticles. With such a solvent, the deposited composite material exhibits a "coffee ring effect," (see, References 19-21 listed below) which concentrates the solute along the rim of the droplets. Deegan (Reference 19 in the list below) has demonstrated that the phenomenon of contact line pinning leads to the coffee ring effect. Because evaporation occurs faster at the edges, the liquid creates an internal flow pulling liquid and material from the center region. To negate this effect, a solvent with a considerably higher boiling point than toluene was added to the solution (Reference 21 in the list below). Xylene, cyclohexanone, and methyl benzoate were tested at various volume mixtures with toluene and PMMA. Methyl benzoate (boiling point—199° C.) was selected for its ability to dissolve PMMA and readily mix with toluene. A v/v mixture of toluene and methyl benzoate at 90:10 was observed to eliminate the "coffee ring effect".

Table 1 gives the physical characteristics of the ink solutions. Printed droplet sizes depend on the device used, the sonication frequency, and the ink solution properties. The sonication frequency usually is the primary determinant for the droplet size. As such, the Sono-Tek droplets are estimated to be 40-50 microns in diameter (Reference 22), while the M$^3$D ultrasonically-generated droplets have not been well-characterized but are expected to exhibit smaller diameters than the Sono-Tek ultrasonically-generated droplets.

TABLE 1

Ink Characteristics.

| Properties | 1 wt % of nanocrystals in Toluene/Methyl Benzoate Ink | 2 wt % of nanocrystals in Toluene/Methyl Benzoate Ink |
| --- | --- | --- |
| Surface Tension | 34.3 ± 0.4 mN/m | 32.9 ± 0.3 mN/m |
| Viscosity | 0.72 ± 0.003 cP | 0.75 ± 0.03 cP |
| Boiling point | ~387 K | ~387 K |

Example 3

Direct Write Printing and Characterization

Direct-write printing was performed with a Sono-Tek Exacta Coat 3-axis robot with an Impact EDGE print head system, and with an aerosol-jet printing system performed with an Optomec—Maskless Mesoscale Materials Deposition System (M$^3$D). X-ray diffraction (XRD) data was collected with a Rigaku Ultima IV Powder XRD. Scanning electron microscopy (SEM) imaging was performed with a Zeiss Supra 40 VP field emission instrument, with voltage ranging 1-3 kV. Transmission electron microscopy (TEM) was performed with an FEI Tecnai G$^2$ Spirit. For naked-eye viewing of the printed features, upconversion luminescence was excited with an Opto Engine LLC MDL-H-980 nm infrared diode laser system with fiber coupling. Images of upconversion luminescence from printed features were obtained with a Nikon D3000 digital SLR with an AF-S DX Micro-NIKKOR 40 mm f/2.8G Macro Lens and attached UV/IR filter.

a. Sono-Tek Printing

Sono-Tek direct-write printing allows for large scale deposition of atomized material over areas up to 15"×15". The material to be printed is injected into the system at a controlled rate using a syringe pump. As the material reaches the three axis robotic print head, an ultrasonic nozzle develops an atomized spray at the conical surface, while a controllable flat jet air deflector directs the material in a fan shaped spray pattern onto a substrate held in place by a vacuum platen. The composite ink was deposited over a 3"×4" area covered by a 10 mil stainless steel stencil prepared by Crookson Electronics. All samples were printed at room temperature with an infusion rate of 1 mL/min of ink, a nozzle velocity of 25 mm/sec, and a spiral patterned deposition with 5 mm spacing between each pass. Drops were adequately small and homogenous when 19 W was applied to the ultrasonic nozzle. Prior to printing the upconversion inks, neat PMMA solutions were used to optimize the printing parameters for film homogeneity. The preliminary inks were composed of 1 wt % PMMA in 90:10 v/v toluene/methyl benzoate mixtures.

Film thickness of the neat polymer averaged 0.75 µm per layer and was consistent over the print area. Films with nanocrystals present in the polymer also averaged 0.75 µm in thickness per layer deposited. For increased total film thickness, individual layers were deposited sequentially. Following each deposition, the solvents were allowed to completely evaporate (~10 min) prior to printing the next layer. The evaporation time of the solvent increased slightly as additional layers were printed because the solvents softened the previous layer(s), creating a gel-like substrate. Printed features were of high optical quality, exhibiting low turbidity.

The parameters determined for PMMA deposition were used to print composite solutions loaded with lanthanide-doped upconversion nanocrystals. The ink was deposited over a stainless steel stencil onto substrates of various characteristics. The laser cut stainless steel screen contained shapes and letters ranging from 1-5 mm in size. The substrates tested were Kapton®, glass slides, and high bond paper. The deposited material adhered well to the paper substrates, due to the absorption of the ink by the paper fibers. Deposition onto Kapton® and glass slides was successful using the same printing parameters. Deposited features on the glass slides had slightly sharper edges compared to those on Kapton®, because of the glass's higher surface energy. The higher surface energy allowed the ink to spread easily on the surface.

Homogenous dispersion of the upconversion nanocrystals throughout the printed composite features was confirmed using SEM. The NaYF$_4$ doped nanocrystals evenly dispersed throughout the printed feature compared to a neat PMMA film. The oleic-acid-capped nanocrystals easily disperse in the polymer matrix, producing a homogeneous film.

b. Optomec M$^3$D Aerosol Jet Printing

M$^3$D uses similar print processes to the Sono-Tek but operates under different mechanics. In contrast to Sono-Tek, M$^3$D uses a programmable platen, on which the substrate is placed. The platen travels in two dimensions to obtain the desired print pattern, while the print head remains stationary. Also different from Sono-Tek, the ink is atomized prior to reaching the system's print head. The ink can be atomized either through an ultra-sonic bath or via pneumatic atomization. The atomized ink then travels through a polymer tube toward the print head. The ink is deposited through a selected nozzle orifice ranging from 150-250 µm in diameter. Ink is focused to a circular shape using a sheath gas, and has the capability of printing line widths ranging from 10 µm to 250 µm. M$^3$D directly prints line-based elements; areas of features are filled in with either a spiral or serpentine array of lines. This allows M$^3$D printing to produce various features, shapes, and passes using Auto-CAD software. Material within the viscosity range of 0.7 cP to 30 cP can be printed on M$^3$D using the ultra-sonic atomizer. Higher viscosities up to 1000 cP require the pneumatic atomizing system. Line widths and film thickness are controlled by changing the flow parameters, the speed of the platen, and the tip size of the deposition head.

The printing parameters for producing optimal lines were developed with PMMA solutions without nanocrystals. As with Sono-Tek deposition, M$^3$D was used to deposit the composite upconversion ink on high bond paper, Kapton®, and glass substrates. Using the ultra-sonic atomizer at room temperature, sheath gas infusion set at 125 ccm, the atomizer set at 40 ccm, and the atomizer power set at 40 V, 45 µm wide lines were successfully achieved with a 150 µm tip. These parameters produced lines with no overspray. The deposited lines produced films with an average thickness of 1.5 μm per layer, as shown in FIG. 6(*a*). Line thickness can be decreased by increasing the speed of the platen, although this leads to the negative side effect of increasing distortion at the corners of the print pattern.

When deposited with M³D, the upconversion films are not as uniform in thickness as compared to Sono-Tek deposition, but the nanoparticles were dispersed homogenously throughout the film.

Example 4

Spectroscopic Characterization of Upconversion Luminescence

Excitation of upconversion luminescence was provided by a 980 nm
CW diode laser system (Thor Labs) operated between 25-125 mW of output power. Excitation power densities were generally in the range of 1-10 W/cm². Upconversion emission was collected and focused with an F-matching lens into a ⅓ m monochromator (Jobin-Yvon, Triax 320) equipped with a red-sensitive photomultiplier tube (Hamamatsu, R2658P). Luminescence signal was detected using a photon counting method. The photomultiplier signal was first pre-amplified (Stanford Research Systems, SR 445A) and then fed into a multichannel scalar (Stanford Research Systems, SR 430) for pulse counting. All spectra were corrected for instrument response.

Steady-state upconversion luminescence spectra were acquired from printed features on bond paper generated using the Sono-Tek printer. The corrected luminescence spectra were used to establish the x, y coordinates of the upconversion emission from our printed features within the C.I.E chromaticity diagram, as shown in FIG. 2. The printed features consisted of areas produced with a single primary ink (red, green or blue), and of areas produced from overlapping primary inks (red+green=yellow; red+blue=magenta; green+blue=cyan; red+green+blue=white). The excitation beam was focused onto the print features to produce power densities in the range of 1-10 W/cm². These excitation power densities correspond to the lower and upper limits, respectively, typically used by us for 'naked-eye' viewing.

Referring to FIG. 2, the vertices of the triangle indicate the observed color of the upconversion luminescence from single-ink (i.e., red, green and blue) printed areas. Variation in excitation power density has very little effect on the C.I.E. coordinates or, therefore, the perceived color of the luminescence from these areas. Similarly, secondary colors produced using combinations of the red and green inks remain stable with excitation power. See, for example, the coordinate marked as 'yellow' in FIG. 2.

Referring to FIG. 2, secondary colors produced using the blue ink (red+blue=magenta; green+blue=cyan; red+green+blue=white) show a shift in hue with changing excitation power density. The line of open circles in each of the cyan, magenta and white regions indicate how the C.I.E. coordinates of these printed features shift as excitation power density changes. The arrows drawn parallel to the line of open circles in each of these regions represent the direction of shift with increasing excitation power density. The dependence of color on excitation power density is due to the fact that the intensity of the blue emission changes more rapidly with power than does that from the red and green inks. This is due to the fact that excitation of blue ink is via a three-photon process, whereas the red and green inks are excited via a two-photon process.

Upconversion luminescence images of printed features for 'naked-eye' viewing were obtained using excitation from a 980 nm diode laser with a fiber coupling. Each substrate (paper, glass, Kapton®) was evaluated with a range of excitation power densities (1-5 W/cm²). Photographic images were obtained with using a 1-3 W/cm² range of excitation power density. The ink was deposited onto substrates of various surface energies through both direct-write and screen printing.

Visual comparisons were made of the upconversion luminescence images from printed features on bond paper using direct write printing methods including screen printing (Sono-Tek) and aerosol jet (M³D) depositions. Samples were deposited using identical ink formulation. The luminescent images were most visible when printed on paper, due to the reflectance and scatter of the substrate.

A crucial criterion for a security printing is its invisibility under standard lighting conditions. The security features deposited from both print systems were invisible under standard lighting conditions. Features became faintly visible only when relatively large amounts of material were deposited, either through multiple layer deposition or increased infusion rates. The visibility of the features was a result of the faint yellow color of the upconversion nanocrystal sample. This faint yellow color can be reduced or removed using more stringent washing procedures.

It was determined that, of the two printing methods, M³D printing produces more sharply defined features and leads to less spreading of material. This increased definition is a result of the printing mechanics of the M³D system. The key factor is the ability of M³D to atomize the ink prior to deposition in combination with using a 150 μm tip. In comparison, Sono-Tek uses an atomizing nozzle with an orifice diameter of 760 μm. The printing is limited by the laser cut manufacturing of the screen and the ability of the spray pattern to wet the substrate through the openings. Upconversion images of printed features were recognizable down to 1 mm in size. Also, when using screen printing, there is considerable waste of ink, because the majority of the ink is deposited on the masked part of the screen. With M³D however, essentially all of the deposited material contributes to the desired print feature. The printing time required using the Sono-Tek system, however, is much shorter than that for M³D. To print identical arrays of shapes and letters as presented here, screen printing with the Sono-Tek system deposited a single layer ~9 times faster than M³D.

Example 5

Security Printing QR Codes

Figure 4:
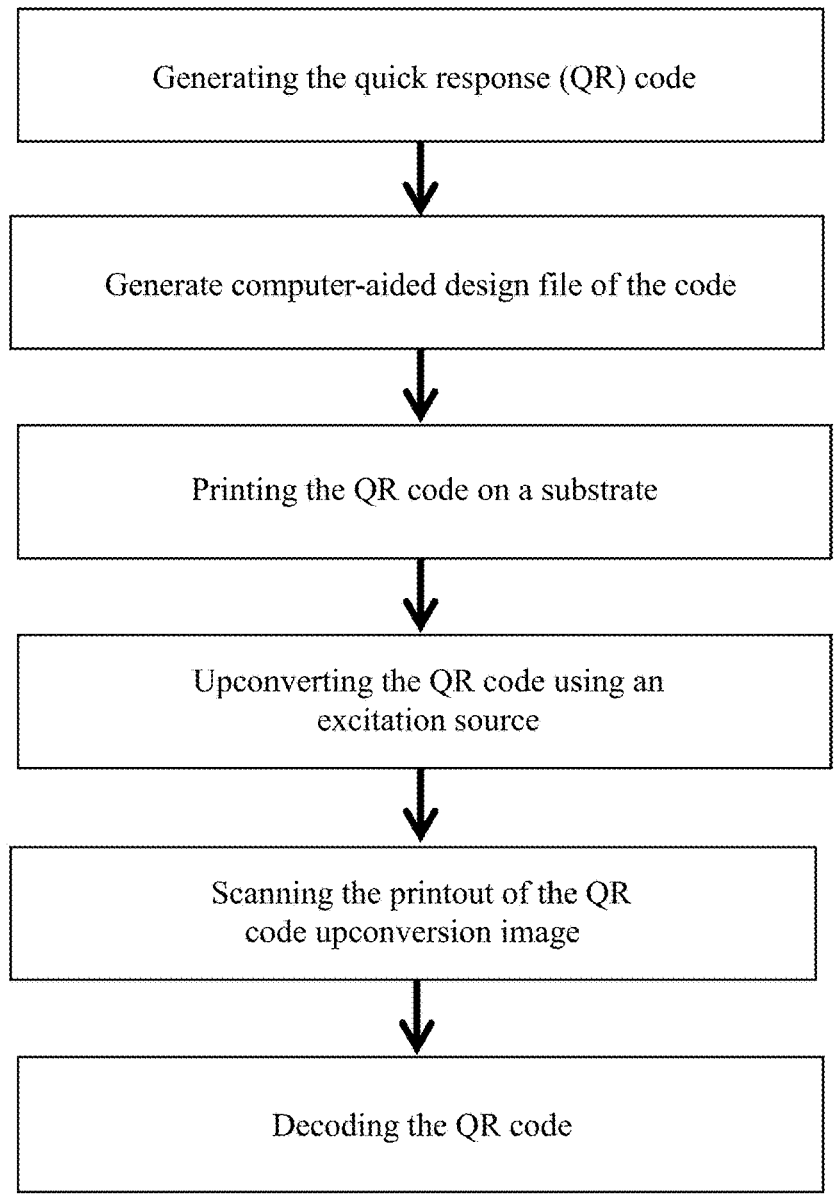
FIG. 4 depicts a flow diagram for generating a QR code by a website, printing it on a paper substrate, upconverting it with NIR laser, scanning the upconverted image with a smart phone and decoding the image.
Figure 5:
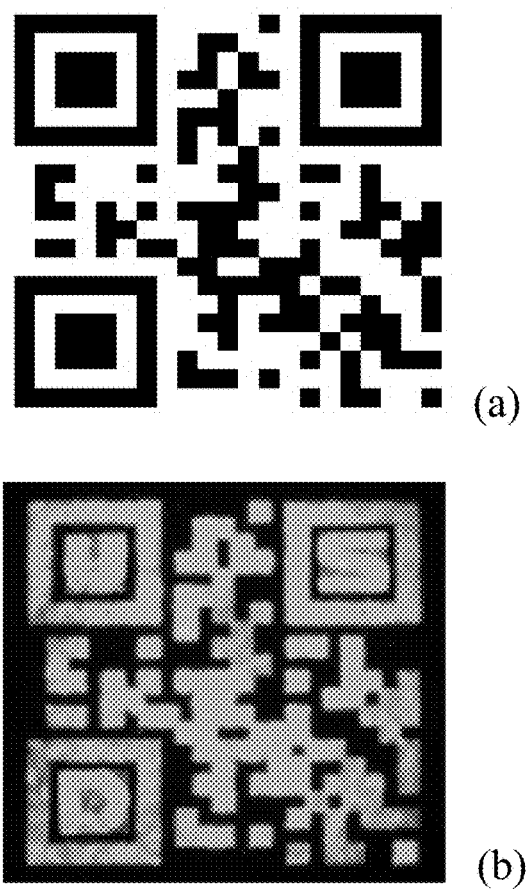
FIG. 5(a) depicts a QR (quick response) code with embedded message "SDSM&T" (South Dakota School of Mines and Technology) printed using standard methods.
FIG. 5(b) depicts the same QR code printed using aerosol jet with the letters "U", "S", and "D" (University of South Dakota written in the upper left, upper right and lower left corners, respectively. The dimensions of the original image are 1.5×1.5 cm.

This example is based in part on the work that was published as Reference 31 in the list below. As described therein, a QR code was printed, according to the method described in FIG. 4, with green upconversion ink, and with a combination of green and blue upconversion inks. The results are depicted in FIG. 5. The dimensions of the QR code are 1.5 cm×1.5 cm. In the FIG. 5(*b*), the letters 'U', 'S', and 'D' (University of South Dakota) in the upper-left, upper-right, and lower-left corners, respectively, of the upconversion QR code were written with two passes of the ink in order to make the upconversion brighter and more legible as a security feature. The remainder of the code was printed in a single pass. FIG. 5(*a*) is a regular QR code of "SDSM&T" (South Dakota School of Mines and Technology) printed on a paper by standard methods. The covert luminescent upconversion image depicted in FIG. 5(b) is of the same QR code printed using aerosol jet with the letters 'U', 'S', and 'D' (University of South Dakota) written in the upper-left, upper-right, and lower-left corners, respectively.

This QR code was read easily by a smart phone, even though the letters 'U', 'S', and 'D' have been added, and are brighter than the rest of the QR code. This result is not surprising as QR codes with 30% error can be read easily by scanning equipment. The entire procedure shown in FIG. 4 is straight-forward and took less than one and a half hours to generate and read the covert QR code. The "invisible" QR codes required only 0.3-0.4 ml of ink per code. In addition, these QR codes can be printed on wide variety of substrates and require no post-print processing. The substrates used in this Example included paper, glass and Kapton®

The addition of the letters "U", "S", and "D" in the QR code demonstrates that multiple levels of security can be embedded within the covert QR codes without interfering with the ability to read the coded information. Letters or symbols, ranging from macroscopic to microscopic, can be embedded within the QR code using different colored inks. Therefore, NIR light can be used to verify visual security features based on added symbols and/or color. For example, the QR code can be printed using any combination of green, blue and red upconverting inks. The blue upconversion is less intense than green, because blue emission results from a three photon process, whereas a two photon process generates green emission.

REFERENCES (1) Vennerberg, D., Lin, Z. (2011). Upconversion nanocrystals: synthesis, properties, assembly and applications. *Sci. Adv. Mater.* 2011, 3, (1), 26-40.

(2) Wang, F., Banerjee, D., Liu, Y., Chen, X., Liu, X. (2010). Upconversion nanoparticles in biological labeling, imaging, and therapy. *Analyst*, 135, (8), 1839-1854.

(3) Wang, F., Liu, X. (2009). Recent advances in the chemistry of lanthanide-doped upconversion nanocrystals. *Chem. Soc. Rev.*, 38, (4), 976-989.

(4) Suyver, J. F., Aebischer, A., Biner, D., Gerner, P., Grimm, J., Heer, S., et al. (2005). Novel materials doped with trivalent lanthanides and transition metal ions showing near-infrared to visible photon upconversion. *Optical Materials*, 27 (6), 1111-1130.

(5) Lim, S. F., Riehn, R., Ryu, W. S., Khanarian, N., Tung, C.-k., Tank, D., et al. (2006). Scanning electron microscopy imaging of upconverting nanophosphors in Caenorhabditis elegans. *Nano Letters*, 6 (2), 169-174.

(6) Zhang, P., Steelant, W., Kumar, M., & Scholfield, M. (2007). Versatile Photosensitizers for photodynamic therapy at infrared excitation. *J. Am. Chem. Soc*, 129 (15), 4526-4527.

(7) Ho, H. P., Wong, W. W., & Wu, S. Y. (2003). Multilayer optical storage disk based on the frequency up-convesion effect from rare-earth ions. *Optical Engineering*, 42 (8), 2349-2353.

(8) Wang, Q. H., & Bass, M. (2004). Photo-luminescent screens for optically written displays based on upconversion of near infrared light. *Electronics Letters*, 40 (16), 987-988.

(9) Shalav, A., Richards, B. S., Trupke, T., Kramer, K. W., & Gudel, H. U. (2005). Application of NaYF[sub4]:Er[sup 3+] upconverting phosphors for enhanced near-infrared silicon solar cell response. *Applied Physics Letters*, 86 (1), 013505-3.

(10) Richard, B. S., & Shalav, A. (2005). The role of polymers in the luminescence conversion for sunlight for enhanced solar cell performance. *Synthetic Metals*, 154 (1-3), 61-64.

(11) Downing, E., Hesselink, L., Ralston, J., & Macfarlane, R. (1996). A three-colour, solid-state, three-dimensional display. *Science*, 273 (5279), 1185-1189.

(12) Thomas R. Hinklin, S.C. (2008). Transparent, Polycrystalline upconverting nanoceramics: Towards 3-D displays. *Advanced Materials*, 20 (7), 1270-1273.

(13) Kim, W. J., Nyk, M, & Prasad, P. N. (2009). Colour-coded multilayer photopatterned microstructures using lanthanide (III) ion co-doped $NaYF_4$ nanoparticles with upconversion luminescence for possible applications in security. *Nanotechnology*, 20, 1-7.

(14) Warner, R. D., & Adams, R. M. (2005). *Introduction to Security Printing* ($1^{St}$ ed.). Sewickley, Pa.: PIA/GATF.

(15) Jay, Tom. (2008, Nov. 19). Printable Security Ink Technologies for Secure Document and ID Card Applications. Presented at *IMI $5^{th}$ Annual Security Printing Conference*.

(16) Power, G. (2005). Patent No. WO 2005/032831. Australia.

(17) Paudel, H. P.; Zhong, L.; Bayat, K.; Baroughi, M. F.; Smith, S.; Lin, C.; Jiang, C.; Berry, M. T.; May, P. S. (2011). Enhancement of near-infrared-to-visible upconversion luminescence using engineered plasmonic gold surfaces. *J. Phys. Chem. C*, 115, 19028-19036.

(18) Lin, C.; Berry, M. T.; Anderson, R.; Smith, S.; May, P. S. (2009). Highly luminescent NIR-to-visible upconversion thin films and monoliths requiring no high-temperature treatment. *Chem. Mater.*, 21, (14), 3406-3413.

(19) Deegan, R. D. (2000). Pattern formation in drying drops. *Physical Review E*, 61, 475-485.

(20) Moon, J., & Jungho, P. (2006). Control of colloidal particle deposit patterns with picoliter droplets ejected by ink-jet printing. *Langmuir*, 22, 3506-3513.

(21) Shubert, U.S., Tekin, E., & Gans, B.-J. d. (2004). Ink-jet printing of polymers—from single dots to thin films. *J. Mater. Chem.*, 14, 2627-2632.

(22) Anonymous, http://www.sono-tek.com/drop-size-and-distribution/, accessed Feb. 9, 2012.

(23) Suyver, J. F., Grimm, J., Krämer, K. W., & Güdel, H. U. (2005). Highly efficient near-infrared to visible upconversion process in $NaYF_4$: $Er^{3+}$, $Yb^{3+}$. *J. Lumin.*, 114 (1), 53-59.

(24) Suyver, J. F., Grimm, J., van Veen, M. K., Biner, D., Krämer, K. W., & Güdel, H. U. (2006). Upconversion spectroscopy and properties of $NaYF_4$ Doped with $Er^{3+}$, $Tm^{3+}$, and/or $Yb^{3+}$. *J. Lumin.*, 117 (1), 1-12.

(25) Suyver, J. F., Aebischer, A., García-Revilla, S., Gerner, P., & Güdel, H. U. (2005). Anomalous power dependence of sensitized upconversion luminescence. *Phys. Rev. B*, 71 (12).

(26) Lin, C., Berry, M. T., Anderson, R., Smith, S., & May, P. S. (2009). Highly luminescent NIR-to-visible upconversion thin films and monoliths requiring No high-temperature treatment. *Chem. Mater.*, 21 (14), 3406-3413.

(27) Mai, H. X.; Zhang, Y. W.; Sun, L. D.; Yan, C. H., Highly efficient multicolor up-conversion emissions and their mechanisms of monodisperse $NaYF_4$: Yb, Er core and core/shell-structured nanocrystals. *J. Phys. Chem. C*, 2007, 111, (37), 13721-13729.

(28) Law, C., So, S. (2010). QR codes in education. *Journal of Educational Technology Development and Exchange*, 3 (1), 85-100.

(29) Liu, X., & Wang, F. (2008). Upconversion multicolour fine-tuning: Visible to near-infrared emission from lanthanide-doped NaYF4 nanoparticles. *J. Am. Chem. Soc.*, 130, 5642-5643.

(30) Blumenthal, T.; Meruga, J.; May, P.S.; Kellar, J.; Cross, W.; Ankiredy, K.; Vunnam, S.; and Luu, Q. N. (2012). Patterned direct-write and screen-printing of NIR-to-visible upconverting inks for security applications. *Nanotechnology*, 23, article ID 185305.

(31) Meruga, J.; Cross, W.; May, P.S.; Luu, Q.; Crawford, G. A.; and Kellar, J. J. (2012). Security printing of covert quick response codes using upconverting nanoparticle inks. *Nanotechnology*, 23, article ID 395201.

* * *

The examples set forth above are provided to give those of ordinary skill in the art a complete disclosure and description of how to make and use embodiments of the compositions, and are not intended to limit the scope of what the inventors regard as their invention. Modifications of the above-described modes (for carrying out the invention that are obvious to persons of skill in the art) are intended to be within the scope of the following claims. All publications, patents and patent applications cited in this specification are incorporated herein by reference as if each such publication, patent or patent application were specifically and individually indicated to be incorporated herein by reference.

What is claimed is:

1. A method for generating a security pattern on a substrate without post-processing after printing, the method comprising the steps of:
   a. preparing an upconverting ink for converting NIR excitation to shorter wavelength luminescence, wherein the upconverting ink comprises 0.1-15 wt % Tm and Er-based nanocrystals, wherein the nanocrystals are capped with ligand, and wherein the ink is formed by mixing the nanocrystals with a polymer in a solvent capable of dissolving the polymer and a co-solvent for controlling ink print quality; wherein the co-solvent constitutes 0.1 to 50 vol % of the solvent;
   b. printing the upconverting ink onto the substrate in a coded color pattern with an ink printer, wherein the coded color pattern comprises primary and secondary colors, wherein the secondary colors are produced by controlling overlap of two or three of the primary colors;
   c. coating the coded color pattern with a material to block one or more spectrums of light while passing NIR light;
   d. producing or stabilizing the security pattern without using post-processing, such as photo-masking photolithography, chemical development, or heat treatment, beyond the printing step;
   e. setting an excitation power density corresponding to the coded color pattern for revealing the security pattern, wherein a change in the excitation power density results in a shift in hue of the coded color pattern;
   f. exposing the coded color pattern to NIR light at the set excitation power density to reveal the security pattern from the coded color pattern; wherein the coded color pattern depends on the excitation power density, and the overlap of two or three of the primary colors, whereby the coded color pattern can only be produced using the excitation power density corresponding specifically to the coded color pattern of the one or more color compositions; and
   g. viewing the security pattern.

2. The method according to claim 1, wherein the nanocrystals further comprise β- NaYF4 nanocrystals.

3. The method according to claim 1, wherein the β-NaYF4 nanocrystals further comprise a mixture of nanocrystals selected from the group consisting of: Er and Yb-based nanocrystals; Tm and Yb-based nanocrystals; and Tm and Er-based nanocrystals.

4. The method according to claim 1, wherein the polymer comprises poly (methl methacrylate (PMMA).

5. The method of according to claim 1, wherein the ink is deposited using a direct-write printing system.

6. The method according to claim 1, further comprising viewing, decoding and/or interpreting the pattern with an electronic device.

7. The method according to claim 1, wherein the primary colors of the coded color pattern further comprises colors within the red-green-blue (RGB) color space.

8. The method according to claim 1, wherein the ink further comprises: 0.1-15 wt % Er and Yb-based nanocrystals; and 0.1-15 wt % Tm and Yb-based nanocrystals.

9. A method for generating security patterns on a substrate without post-processing after printing, the method comprising the steps of:
   a. preparing an upconverting ink, wherein the upconverting ink converts NIR excitation to shorter wavelength luminescence and comprises at least 0.1-15 wt % Tm and Er-based nanocrystals capped with a ligand, and wherein the ink is formed by mixing the nanocrystals with a polymer in a solvent capable of dissolving the polymer and a co-solvent for controlling ink print quality, wherein the co-solvent constitutes 0.1 to 50 vol% of the solvent;
   b. directly depositing the ink onto the substrate with an ink printer in a coded color pattern of one or more color compositions, wherein the coded color pattern is indiscernible under ambient light and discernable with an excitation power density, wherein the coded color pattern comprises primary and secondary colors forming one or more color compositions, wherein the secondary colors are produced by controlling overlap of two or three of the primary colors;
   c. coating the coded color pattern with a material to block one or more spectrums of light while passing NIR light;
   d. producing or stabilizing the security pattern without using post-processing, such as photo-masking photolithography, chemical development, or heat treatment, beyond the printing step;
   e. exposing the coded color pattern to NIR light having the corresponding excitation power density to decode the coded color pattern for revealing the security pattern, wherein the coded color pattern depends on the excitation power density, and the overlap of two or three of the primary colors, whereby the coded color pattern can only be produced using the excitation power density corresponding specifically to the coded color pattern of the one or more color compositions; and
   f. viewing the coded color pattern from the security pattern.

10. The method according to claim 9 further comprising blocking UV and visible light with the coating material.

11. The method according to claim 9, wherein the security pattern is captured with a charge-coupled device.

12. The method according to claim 11, wherein the security pattern is decoded and interpreted with an electronic device containing the charge-coupled device.

13. The method according to claim 9, wherein the security pattern is direct written on the substrate.

14. The method according to claim 9 further comprising interrogating the security with excitation wavelength spectrums from between 940 nm to 1070 nm.

* * * * *